United States Patent [19]

Endo

[11] 4,233,428
[45] Nov. 11, 1980

[54] PRIMER COMPOSITIONS FOR SILICONE RUBBER COMPOSITIONS

[75] Inventor: Isao Endo, Oota, Japan

[73] Assignee: General Electric Company, Waterford, N.Y.

[21] Appl. No.: 966,244

[22] Filed: Dec. 4, 1978

[51] Int. Cl.³ .................... C08L 63/02; C08L 63/04; C08L 83/06
[52] U.S. Cl. .................................. 525/507; 156/329; 156/330; 428/413; 525/523; 528/27
[58] Field of Search .................. 528/27, 109, 120; 260/824 EP, 825, 448.2; 525/507, 523

[56] References Cited

U.S. PATENT DOCUMENTS

| | | | |
|---|---|---|---|
| 2,843,560 | 7/1958 | Mika | 528/27 |
| 3,211,684 | 10/1965 | Eakins | 260/824 EP |
| 3,220,878 | 11/1965 | Pines | 260/825 |
| 3,379,659 | 4/1968 | Murphy | 260/825 |

*Primary Examiner*—Wilbert J. Briggs, Sr.
*Attorney, Agent, or Firm*—John L. Young; Michael J. Doyle; E. Philip Koltos

[57] ABSTRACT

A primer composition for silicone rubber compositions comprising an epoxy resin, an amine functional silane, an aminoxy functional silane, or siloxane, a mercapto functional silane, and an organic solvent. Such primer compositions are especially used as primer compositions for aminoxy curing room temperature vulcanizable silicone rubber compositions.

18 Claims, No Drawings

PRIMER COMPOSITIONS FOR SILICONE RUBBER COMPOSITIONS

BACKGROUND OF THE INVENTION

This invention pertains to primer compositions which form a strong transparent film on a base material (or substrate) by normal air drying.

The technique of treating base materials with various primers before applying room-temperature cured silicone rubber as an adhesive is a general and widely used adhesion method involving base materials and silicone rubber cured at room temperature. One of the main uses of this silicone rubber cured at room temperature is for sealing buildings. However adhesion involving mortar, autoclaved light-weight concrete (ALC) and pre-cast concrete (PC) is always difficult and displays problems in durability. Since these base materials are porous, the applied primer permeates inward and makes it difficult to form a strong film on the adhesion side. Also the free passage of water through capillary tubes lessens their bonding strength. Furthermore, the basic strength of these materials encourages deterioration of primer compositions and causes delamination. The use in recent years of aluminum (anti-corrosive aluminum, natural color-forming aluminum), metals such as stainless steel, special coating materials, plastics, and organic rubbers as building materials has necessitated the development of compositions which form a strong film on these base materials. Inventions using silane or siloxane containing mercapto groups have been introduced (Public issue No. 139831 of TOKKAI, 1976), but these also are ineffective when the base materials are vinylchloride resin, acrylic resin, polysulfide type sealing material or concrete. This present invention corrects these past deficiencies by presenting compositions which form films that are heat-resistant, water-resistant, and alkali-resistant, and will form strong films on mortar, concrete, ALC, PC polyvinylchloride, aluminum, metals such as stainless steel, special painted surfaces, plastics, and organic rubber.

SUMMARY OF THE INVENTION

In short this invention pertains to film-forming compositions comprising the following materials:

(A) 100 parts by weight of epoxy resin containing 2 or more groups expressed by the formula

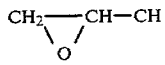

within each of its molecules;

(B) From 50 to 500 parts by weight of silane containing amino groups expressed by the formula $R^1CH_2CH_2CH_2Si(OR^2)_3$ where $R^1$ is a nitrogen-containing group selected from substituted or unsubstituted amino groups expressed by the formulas $Q_2{}^1N—$ and $Q_2{}^2N(CH_2)_2NH—$ wherein $Q^1$ and $Q^2$ are groups selected from a hydrogen atom and an alkyl group respectively, and $R^2$ is a monovalent hydrocarbon group;

(C) From 30 to 500 parts by weight of organic silicon compound containing the group expressed by the formula $R_2{}^3NOSi—$ wherein $R^3$ is a group selected from the class consisting of a hydrogen atom and a monovalent hydrocarbon group with no aliphatic unsaturation.

(D) From 100 to 1000 parts by weight of a silane containing mercapto group expressed by the formula $HS(CH_2)_aSi(OR^4)_3$ where a is either 2 or 3, and $R^4$ is a monovalent hydrocarbon radical; and (E) 1 or more organic solvents.

Some of the epoxy resin (A) used in this invention may be expressed by the general formula

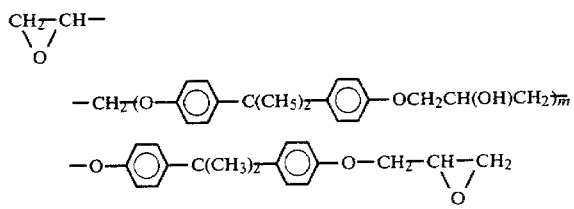

where m is a integer in the 1 to 15 range), and by the general formula

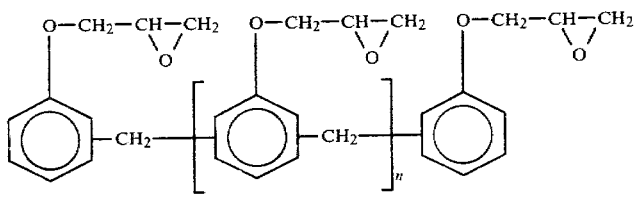

where n is an integer in the 0 to 3 range. Specifically, they may be one of the following:

Epicoat (tradename of Shell Chemical)—815, 820, 828, 834, 864, 1001, 1004, 1007, 1009, 152, 154.

Araldite (tradename of Ciba Co)—6005, 6010, 6020, 6030, 6040, 6050.

Epomic (tradename of Mitsui)—R-130, R-133, R-139, R-140, R-144, R-301, R-302, R-304, R-307.

The silane containing amino group (B) used in this invention contributes as an adhesion promoter. Its list includes the following:

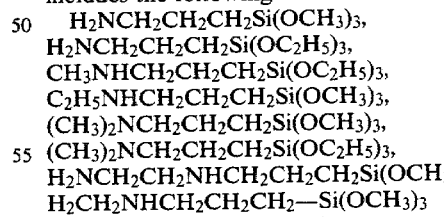

Although the amount to be compounded ranges from 50 to 500 parts by weight per 100 parts by weight of the epoxy resin (A), preferably it should range from 50 to 350 parts by weight. If the amount of silane containing amino group is too little, its adhesive property will not be adequate, and if too great, the composition tends to gel.

The organic silicon compound (C) used in this invention contains an aminoxy group directly bonded to the silicon and works as a crosslinking agent for the epoxy resin affected by the ring-opening reaction of the cyclic siloxane and the reaction between the epoxy resin and its aminoxy group. The organic silicon compound may be a silane containing aminoxy group such as $(CH_3)_2Si[ON(C_2H_5)_2]_2$ $CH_3Si[ON(C_2H_5)_2]_3$, $C_6H_5Si[ON(C_2H_5)_2]_3$ $(CH_3)_2Si(ONHC_6H_5)_2$ or a low molecular linear siloxane containing aminoxy group such as $(C_2H_5)_2NO[(CH_3)_2SiO]_2N(C_2H_5)_2$, $(C_2H_5)_2NO[(CH_3)_2SiO]_3N(C_2H_5)_2$, $(C_2H_5)_2NO[(CH_3)_2SiO][(C_6H_5)_2SiO][(CH_3)_2SiO]N(C_2H_5)_2$, $(C_2H_5)_2NO[(CH_3)_2SiO]_6N(C_2H_5)_2$,

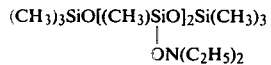

or may be a polysiloxane containing an aminoxy group expressed by the general formula $(C_2H_5)_2NO[(CH_3)_2SiO]_xN(C_2H_5)_2$,

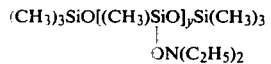

or $(CH_3)_3SiO[(CH_3)SiO]_p[(CH_3)_2SiO]_qSi(CH_3)_3$ where viscosity is 10 to 100,000 cP in 25° C. and x, y, p, and q in the formulas are of such values that the polysiloxane falls within the viscosity range mentioned above. The compound may also be a cyclic polysiloxane containing an aminoxy group expressed by the formula

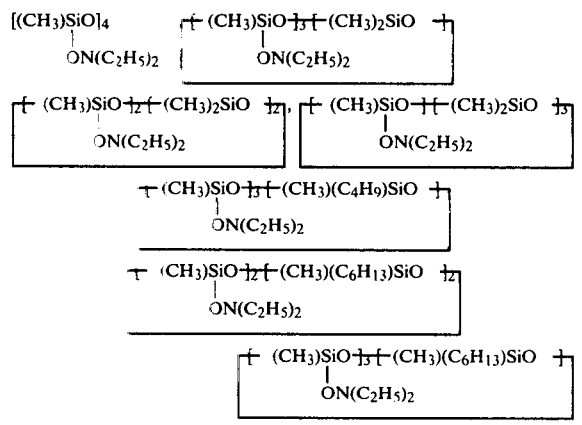

or a branching structure polysiloxane containing an aminoxy group expressed by the formula

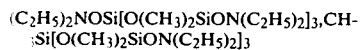

Although the amount to be compounded may be within the range 30 to 500 parts by weight per 100 parts by weight of epoxy resin (A), preferably it should be in the 80 to 200 parts by weight range. If the amount of organic silicon compound (C) is too small, an effective adhesive property cannot be created, and if too great, the composition tends to gel.

The silane containing a mercapto group (D) used in this invention also improves adhesion and may be expressed as one of the following: $HSCH_2CH_2Si(OCH_3)_3$, $HSCH_2CH_2Si(OCH_2H_5)_3$, $HSCH_2CH_2CH_2Si(OCH_3)_3$, or $HSCH_2CH_2CH_2Si(OC_2H_5)_3$. Although the amount to be compounded may be within the range of 100 to 1000 parts by weight per 100 parts by weight of epoxy resin (A), preferably it should be within the 400 to 600 parts by weight range. If the amount of silane containing a mercapto group is too small, adhesive properties are inferior, as are the materials' water-resisting and acid-resisting properties, and if too great it tends to gel.

The organic solvent (E) used in this invention may be an aromatic hydrocarbon such as benzene, toluene, xylene, ethylbenzene, or an aliphatic hydrocarbon such as n-pentane, n-hexane, n-heptane, or ether type such as diethyl ether, dibutyl ether, tetrahydrofuran, dioxane, or ketone type such as acetone, methylethylhetane, or alcohol type such as methanol ethanol or isopropylalcohol or an ester type such as methyl acetate, ethyl acetate, or butyl acetate. These organic solvents provide appropriate viscosity and stability in preservation to the compositions and may be used independently or in a combination using more than one kind of solvents. Although the amount of organic solvent to be used may be in the range of 500 to 5000 parts by weight per 100 parts by weight of epoxy resin (A), preferably it should be in the 1000 to 2500 parts by weight range. If the amount of solvent is too small, gelation takes place, and if it is too great, a good film necessary for adhesion cannot be effectively formed.

The film-forming compositions of this present invention can be made by a simple mixing of these components. However, if the composition is heated and aged at a temperature range of between 50° and 100° C., dryness of the film-forming compositions is promoted, and adhesiveness is improved. The composition of this invention is employed in sealing works using silicone rubber cured at room temperature as a priming agent to promote the adhesion of silicone rubber to base materials by applying it to the surface of the substrate previously and drying it, and thus forming a film on the substrate. It is especially valuable when mortar, concrete, ALC or PC are used as base materials. It can also be used as a priming agent in the sealing and encapsulation of electric parts, or as anti-corrosion film or as lacquer for various base materials. Such a primer is especially useful for a silicone rubber composition having as its basic ingredients a silanol terminated diorganopolysiloxane having a viscosity of 300 to 500,000 centipoise at 25° C. where the organo groups are monovalent hydrocarbon radicals with a cross-linking agent which is an aminoxy functional silane or siloxane having at least 2 radicals per molecules of the formula $R_2^7NOSi\equiv$ where $R^7$ is selected from the class of hydrogen and monovalent hydrocarbon radicals having no aliphatic unsaturation. These aminoxy functional silanes or siloxanes which are used at a range of 0.1 to 50 part per 100 parts of the base polymer can be any of the compounds shown for ingredient (C) in the primar composition.

Practical uses of this invention are given below. All parts used in these cases are parts by weight. The symbols used in the tables indicate the following physical properties.

$M_{50}$: Stress at 50% elongation
$M_{150}$: Stress at 150% elongation
TS: Maximum stress at fracture
R: Maximum rate of elongation
CF: Rate of cohesion fracture

EXAMPLE 1

The composition is produced by preparing 15 parts of Epicote 828 (tradename for epoxy resin used by Shell Chemical Co.), 37.5 parts of $H_2NCH_2CH_2CH_2Si(OCH_3)_3$, 18 parts of

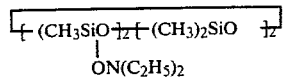

70 parts of $HSCH_2CH_2CH_2Si(OCH_3)_3$, 200 parts of ethyl acetate, and 150 parts of toluene in a three neck flask equipped with an agitator, water-cooling condenser, and thermometer, and heating the mixture for 3 hours at 70° C. while agitating it. The composition is spread as a primer on base materials (1) such as glass, aluminum, mortar and polyester, followed by 30 minutes of air-drying. After this, aminoxy-type silicone sealing material Tosseal 361 (tradename of Toshiba Silicone Co.) is applied to surface 2, treated with the primer. A tensile test at a speed of 50 mm/min. is conducted on materials cured for 7 days at room temperature, and for 7 days at 50° C., and on materials in an ordinary state and those immersed in warm water at 50° C. for 2 days. The results show no rupture of the adhesion surface. Table 1 indicates the results of observations made on fractures of all the sealing material layers.

TABLE 1

|  | Normal Condition | | | | After Immersion | | | |
| --- | --- | --- | --- | --- | --- | --- | --- | --- |
|  | $M_{50}$ kg/cm² | TS kg/cm² | E % | CF % | $M_{50}$ kg/cm² | TS kg/cm² | E % | CF % |
| Glass | 1.6 | 6.3 | 1250 | 100 | 1.5 | 5.8 | 1310 | 100 |
| Aluminum | 1.7 | 6.2 | 1320 | 100 | 1.6 | 5.9 | 1300 | 100 |
| Mortar | 1.5 | 5.6 | 1100 | 100 | 1.5 | 5.7 | 1200 | 100 |
| Polyester | 1.7 | 5.7 | 1230 | 100 | 1.6 | 5.5 | 1300 | 100 |

EXAMPLE 2

A composition obtained by the same method as in Example 1 is spread on glass, aluminum, stainless steel SUS-304, and copper, and then applied with Tosseal 361 (tradename of Toshiba Silicone Co.). Table 2 indicates the results obtained on the materials which were cured for 7 days at 20° C., and for 7 days at 50° C., on materials under normal conditions, and on those immersed for 14 days in a water solution of 50° C. at a pH of 2 adjusted with sulfuric acid and containing 4% common salt; then extracted and measured by an Autograph (tradename of Shimazu Manufacturing Co.) after 15 minutes. The same table also indicates values measured by the afore-mentioned method on materials for comparison with the same composition as the one in example 1, but excluding $HSCH_2CH_2CH_2Si(OCH_3)_3$.

TABLE 2

|  |  | Normal Condition | | | | After Immersion | | | |
| --- | --- | --- | --- | --- | --- | --- | --- | --- | --- |
|  |  | $M_{50}$ kg/cm² | TS kg/cm² | E % | CF % | $M_{50}$ kg/cm² | TS kg/cm² | E % | CF % |
| This Invention | Glass | 1.2 | 5.2 | 1300 | 100 | 1.1 | 6.1 | 1400 | 100 |
|  | Aluminum | 1.2 | 5.1 | 1250 | 100 | 1.1 | 6.2 | 1420 | 100 |
|  | SUS-304 | 1.2 | 4.9 | 1300 | 100 | 1.1 | 6.1 | 1450 | 100 |
|  | Copper | 1.2 | 5.0 | 1330 | 100 | 1.1 | 6.5 | 1440 | 100 |
| Comparative Examples | Glass | 1.2 | 4.8 | 1280 | 100 | 1.1 | 2.3 | 350 | 0 |
|  | Aluminum | 1.2 | 5.0 | 1320 | 100 | 1.1 | 1.8 | 200 | 0 |
|  | SUS-304 | 1.2 | 5.0 | 1300 | 100 | delamination | | | |
|  | Copper | 1.2 | 5.2 | 1330 | 100 | delamination | | | |

EXAMPLE 3

The only differing factor here compared to Example 1 is the usage of 20 parts of $(C_2H_5)_2NO[(CH_3)_2SiO][(C_6H_5)_2SiO+ +(CH_3)_2SiO]N(C_2H_5)_2$ instead of

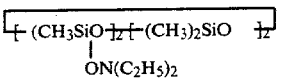

in this composition, which is obtained by the same method as noted in Example 1. This composition is spread as a primer on polysulfide sealing material, or polyurethane sealing material (4) processed on glass substrate (1). After air-drying the material, silicone sealing material (3) consisting of Tosseal 361 (tradename of Toshiba Silicone Co.) is applied on the primer-treated surface (2). The mean values of the physical properties of the 3 kinds of test specimens in an ordinary state and after a 20-day immersion in warm water at 50° C. are recorded in Table 3.

TABLE 3

|  | Normal Condition | | | | After Immersion | | | |
| --- | --- | --- | --- | --- | --- | --- | --- | --- |
|  | $M_{50}$ kg/cm² | TS kg/cm² | E % | CF % | $M_{50}$ kg/cm² | TS kg/cm² | E % | CF % |
| Polysulfide | 1.7 | 5.7 | 1200 | 100 | 1.6 | 5.6 | 1250 | 100 |
| Polyurethane | 1.6 | 4.9 | 1100 | 100 | 1.6 | 5.0 | 1200 | 100 |

EXAMPLE 4

The same components as the ones in Example 1 are used except for 15 parts of Epicoat 864 (tradename of Shell Chemical Co.) instead of Epicoat 828, and 30 parts of $H_2NCH_2CH_2NHCH_2CH_2CH_2—Si(OCH_3)_3$ instead of $H_2NCH_2CH_2CH_2Si(OCH_3)_3$ and is obtained this composition by the same method as noted in Example 1. It is spread on the base materials listed in Table 4, and after an air-drying period of 30 minutes, Tosseal 361 (tradename of Toshiba Silicone Co.) is applied to create a test specimen. This specimen was dried at 20° C. for 7 days and 50° C. for 7 days respectively, and underwent a tensile test at a speed of 50 mm/min in an ordinary state and after a 2-day immersion in 50° C. warm water. The test results are shown in Table 4.

TABLE 4

|  | Normal Condition | | | | After Immersion | | | |
| --- | --- | --- | --- | --- | --- | --- | --- | --- |
|  | $M_{150}$ kg/cm² | TS kg/cm² | E % | CF % | $M_{150}$ kg/cm² | TS kg/cm² | E % | CF % |
| FRP | 1.6 | 4.2 | 1250 | 100 | 1.5 | 4.9 | 1480 | 100 |
| Acrylresin | 1.6 | 5.0 | 1300 | 100 | 1.5 | 5.2 | 1400 | 100 |
| Nylonresin | 1.5 | 5.0 | 1350 | 100 | 1.5 | 5.5 | 1400 | 100 |
| ABS | 1.4 | 4.8 | 1250 | 100 | 1.4 | 5.2 | 1300 | 100 |

TABLE 4-continued

|  | Normal Condition | | | | After Immersion | | | |
|---|---|---|---|---|---|---|---|---|
|  | $M_{150}$ kg/cm² | TS kg/cm² | E % | CF % | $M_{150}$ kg/cm² | TS kg/cm² | E % | CF % |
| Silicone-varnish | 4 | 4.5 | 1330 | 100 | 1.4 | 5.1 | 1430 | 100 |
| Phenolresin | 5 | 5.3 | 1400 | 100 | 1.5 | 5.6 | 1480 | 100 |
| Epoxyresin | 5 | 5.0 | 1420 | 100 | 1.5 | 5.4 | 1400 | 100 |
| Melamine-resin | 4 | 4.6 | 1280 | 100 | 1.5 | 5.8 | 1430 | 100 |
| Polycarbonate | 5 | 5.2 | 1300 | 100 | 1.4 | 5.0 | 1450 | 100 |
| Polyvinyl-chloride | 5 | 5.2 | 1470 | 100 | 1.5 | 6.1 | 1430 | 100 |
| Soft-poly-urethane | 4 | 5.4 | 1500 | 100 | 1.4 | 5.4 | 1550 | 100 |
| Polyester | 5 | 4.6 | 1130 | 100 | 1.5 | 5.0 | 1200 | 100 |
| Polystyrene | 5 | 4.3 | 1200 | 100 | 1.5 | 4.8 | 1300 | 100 |
| Urearesin | 5 | 4.8 | 1300 | 100 | 1.5 | 5.2 | 1250 | 100 |
| Soft steel | 5 | 5.3 | 1280 | 100 | 1.3 | 4.6 | 1470 | 100 |
| Tin plated steel | 4 | 5.1 | 1290 | 100 | 1.4 | 4.9 | 1500 | 100 |
| Zinc plated steel | 5 | 5.3 | 1580 | 100 | 1.4 | 4.9 | 1550 | 100 |
| Aluminum | 5 | 5.5 | 1280 | 100 | 1.4 | 4.3 | 1430 | 100 |
| Gelalmin | 5 | 5.0 | 1350 | 100 | 1.4 | 4.7 | 1410 | 100 |
| Corrosion resistance aluminum | 4 | 5.4 | 1430 | 100 | 1.5 | 5.6 | 1420 | 100 |
| SUS-27 | 5 | 4.7 | 1230 | 100 | 1.4 | 5.4 | 1460 | 100 |
| SUS-32 | 4 | 5.4 | 1390 | 100 | 1.4 | 5.6 | 1430 | 100 |
| Copper | 4 | 5.5 | 1380 | 100 | 1.3 | 5.3 | 1450 | 100 |
| Yellow Copper | 4 | 5.5 | 1360 | 100 | 1.3 | 5.0 | 1460 | 100 |
| Preparin | 5 | 4.7 | 1200 | 100 | 1.5 | 4.8 | 1350 | 100 |
| Polyvinyl-chloride-coated steel | 5 | 4.9 | 1350 | 100 | 1.5 | 4.7 | 1280 | 100 |
| Mortar | 5 | 5.9 | 1280 | 100 | 1.5 | 5.7 | 1380 | 100 |
| ALC | 5 | 4.8 | 1300 | 100 | 1.5 | 5.0 | 1280 | 100 |
| Marble | 5 | 5.2 | 1230 | 100 | 1.6 | 4.5 | 1200 | 100 |
| Granite | 5 | 5.6 | 1230 | 100 | 1.6 | 5.8 | 1300 | 100 |
| Slate | 5 | 5.3 | 1290 | 100 | 1.6 | 4.8 | 1200 | 100 |
| Tile | 4 | 4.4 | 1300 | 100 | 1.3 | 4.6 | 1330 | 100 |
| Heatray-reflecting glass | 5 | 4.9 | 1200 | 100 | 1.5 | 5.2 | 1350 | 100 |

EXAMPLE 5

A mixture of 15 parts Araldite 6020 (tradename of Ciba Co.), 30 parts of $H_2NCH_2CH_2CH_2Si(OC_2H_5)_3$, 25 parts of $CH_3Si—[ON(C_2H_5)_2]_3$, 60 parts of $HSCH_2CH_2CH_2Si(OCH_3)_3$ and 300 parts of n-hexane, is spread on glass after 2-hour shaking of the mixture. After a 1-hour drying period, Tosseal 361 (tradename of Toshiba Silicone Co.) is applied to create 3 test specimens. After these specimens are irradiated by ultra-violet rays for 500 hours by a sunshine weather meter, the mean values obtained from the test are measured by an Autograph (tradename of Shimazu Manufacturing Co.). The modulus at 50 percent extension is 1.4 kg/cm², maximum tensile stress was 6.0 kg/cm², maximum elongation rate was 1250 percent and rate of cohesion fracture was 100 percent.

TABLE 5

|  | Normal Condition | | | | After Immersion | | | |
|---|---|---|---|---|---|---|---|---|
|  | $M_{150}$ kg/cm² | TS kg/cm² | E % | CF % | $M_{150}$ kg/cm² | TS kg/cm² | E % | CF % |
| Acryl series | — | 4.8 | 1250 | 100 | 1.3 | 4.7 | 1380 | 100 |
| Vinylchloride series | 1.3 | 4.9 | 1300 | 100 | 1.3 | 4.7 | 1400 | 100 |
| Ureathane series | 1.3 | 4.2 | 1200 | 100 | 1.3 | 4.3 | 1210 | 100 |
| Epoxy series | 1.3 | 4.3 | 1100 | 100 | 1.3 | 4.9 | 1480 | 100 |
| Alkyd series | 1.3 | 4.5 | 1200 | 100 | 1.2 | 4.4 | 1230 | 100 |
| Phthalic acid series | 1.3 | 4.9 | 1470 | 100 | 1.3 | 5.0 | 1440 | 100 |
| Vinylden fluoride series | 1.3 | 3.4 | 1080 | 100 | 1.3 | 4.2 | 1200 | 100 |

EXAMPLE 6

A composition with the same ingredients as Example 1 is created except for the use of 60 parts $HSCH_2CH_2CH_2Si(OCH_2H_5)_3$ instead of $HSCH_2CH_2CH_2Si(OCH_3)$. This is applied on a aluminum sheet coated with various coating materials. A test specimen is created by applying Tosseal 361 (tradename of Toshiba Silicone Co.) then dried for 7 days at 20° C. and at 50° C. respectively and then measured by an Autograph (tradename of Shimazu Manufacturing Co.) in a normal condition and after being immersed in warm water for 7 days at 50° C. The results are shown in Table 5.

EXAMPLE 7

A composition created by the method noted in Example 5 using the same materials except for using 60 parts of $HSCH_2CH_2Si(OCH_3)$ instead of $HSCH_2CH_2CH_2Si(OCH_3)_3$ was applied on glass, aluminum, mortar, and polyester substrates. The same tensile test as mentioned in Example 1 is conducted on materials in an ordinary state and after a 2-day immersion in warm water at 50° C. In each case, the rate of cohesion rupture was 100% and the adhesion proved to be good.

EXAMPLE 8

A composition is created consisting of 15 parts of Epicoat 828 (tradename used by Shell Chemical Co.), 20 parts of $(CH_3)_2NCH_2CH_2NHCH_2CH_2Si(OCH_3)_3$, 22.5 parts of

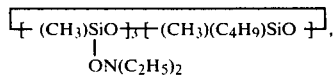

45 parts of $H_2SCH_2CH_2CH_2Si(OCH_3)_3$ and 300 parts of toluene combined by the method mentioned in Example 1. This composition is applied on a copper plate, air dried for 5 hours to form a strong film. This treated copper plate and an untreated copper plate used as comparative material are left in a hydrogen chloride atmosphere. After a period of 2 weeks, blue-color rust is formed on the untreated copper plate, but no abnormalities are detected on the treated copper plate.

I claim:

1. A primer composition for a silicone rubber composition comprising, (a) 100 parts by weight of epoxy resin containing more than 2 radicals expressed by the formula

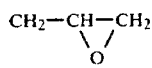

within each molecule;
(b) from 50 to 500 parts by weight of a silane containing an amino group expressed by the formula $R^1CH_2CH_2CH_2Si(OR^2)_3$ wherein $R^1$ is a nitrogen-containing group selected from the class consisting of substituted or unsubstituted amino groups expressed by $Q_2^1N$ and $Q_2^2N(CH_2)_2NH$ wherein $Q^1$ and $Q^2$ are groups selected from the class consisting of a hydrogen atom and an alkyl radical respectively, and $R^2$ is a monovalent hydrocarbon group;
(c) from 30 to 500 parts by weight of an organic silicon compound containing the group expressed by the formula $R_2^3NOSi\equiv$ wherein $R^3$ is a group selected from the class consisting of a hydrogen atom and a monovalent hydrocarbon group with no aliphatic unsaturation;
(d) from 100 to 1000 parts by weight of a mercapto-containing silane expressed by the formula $HS(CH_2)_aSi(OR^4)_3$ wherein a has a value of either 2 or 3, and $R^4$ is a monovalent hydrocarbon group; and
(e) an organic solvent.

2. The composition of claim 1 wherein epoxy resin (a) is the resin expressed by the general formula,

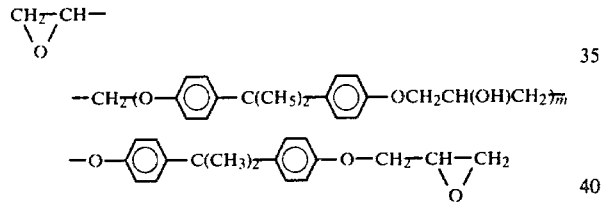

wherein m has a value of between 1 and 15.

3. The composition of claim 1 wherein epoxy resin (a) is the resin expressed by the general formula,

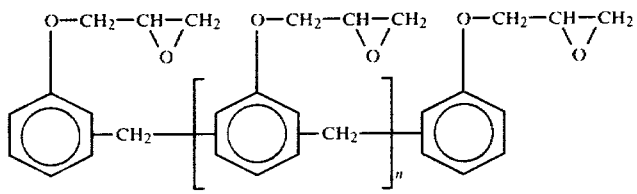

wherein n has a value of between 0 and 3.

4. The composition of claim 1 wherein the silane containing amino group (b) is the silane expressed by the formula, $NH_2CH_2CH_2CH_2Si(OR^5)_3$ wherein $R^5$ is a group selected from the class consisting of a methyl radical and an ethyl radical.

5. The composition of claim 1 wherein the silane-containing amino group (b) is expressed by the formula $H_2NCH_2CH_2NHCH_2-CH_2CH_2Si(OCH_3)_3$.

6. The composition of claim 1 wherein the organic silicon compound (c) is the compound expressed by the formula,

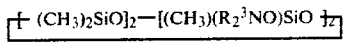

7. The composition of claim 6 wherein the $R^3$ is an ethyl radical.

8. The composition of claim 1 wherein the organic silicon compound (c) is the compound expressed by the formula $CH_3Si(ONR_2^3)_3$.

9. The composition of claim 1 wherein the silane containing the mercapto (d) is expressed by the formula $HSCH_2CH_2CH_2Si(OCH_3)_3$.

10. A process for forming a primer composition for silicone rubber compositions comprising mixing
(a) 100 parts by weight of epoxy resin containing more than 2 radicals expressed by the formula

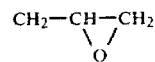

within each molecule;
(b) from 50 to 500 parts by weight of a silane containing an amino group expressed by the formula $R^1CH_2CH_2CH_2Si(OR^2)_3$ wherein $R^1$ is a nitrogen-containing group selected from the class consisting of substituted or unsubstituted amino groups expressed by $Q_2^1N$ and $Q_2^2N(CH_2)_2NH$ wherein $Q^1$ and $Q^2$ are groups selected from the class consisting of a hydrogen atom and an alkyl radical respectively, and $R^2$ is a monovalent hydrocarbon group;
(c) from 30 to 500 parts by weight of an organic silicon compound containing the group expressed by the formula $R_2^3NOSi\equiv$ wherein $R^3$ is a group selected from the class consisting of a hydrogen atom and a monovalent hydrocarbon group with no aliphatic unsaturation;
(d) from 100 to 1000 parts by wweight of a mercapto-containing silane expressed by the formula $HS(CH_2)_aSi(OR^4)_3$ wherein a has a value of either 2 or 3, and $R^4$ is a monovalent hydrocarbon group; and
(e) an organic solvent.

11. The process of claim 10 wherein the epoxy resin (a) is a resin expressed by the general formula,

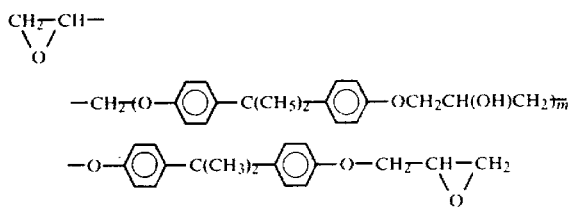

12. The process of claim 10 wherein the epoxy resin (a) is the resin expressed by the general formula,

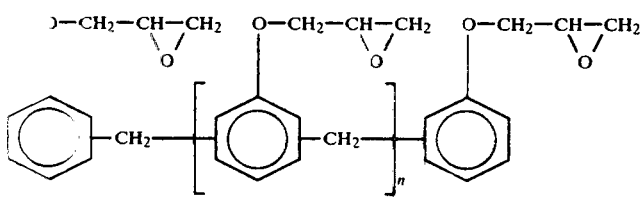

wherein n has a value of between 0 and 3.

13. The process of claim 10 wherein the silane amino compound (b) is the silane expressed by the formula $NH_2CH_2CH_2CH_2Si(OR^5)_3$ wherein $R^5$ is a group selected from the class consisting of a methyl radical and an ethyl radical.

14. The process of claim 10 wherein the silane-containing amino (b) is expressed by the formula $H_2NCH_2CH_2NHCH_2CH_2CH_2Si(OCH_3)_3$.

15. The process of claim 10 wherein the organic silicon compound (c) is the compound expressed by the formula,

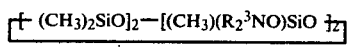

16. The process of claim 15 wherein the $R^3$ is an ethyl radical.

17. The process of claim 10 wherein the organic silicon compound (c) is the compound expressed by the formula $CH_3Si(ONR_2^3)_3$.

18. The process of claim 10 wherein the silane containing the mercapto group (d) is expressed by the formula $HSCH_2CH_2CH_2Si(OCH_3)_3$.